US008094797B2

(12) United States Patent
Dellarole et al.

(10) Patent No.: US 8,094,797 B2
(45) Date of Patent: Jan. 10, 2012

(54) SERVICE PROVISIONING AND ACTIVATION ENGINES FOR SYSTEM (75) Inventors: Marco Dellarole, Cannes (FR); Takashi Toda, Tokyo (JP)

(73) Assignee: Accenture Global Services Limited (IE)

( * ) Notice: Subject to any disclaimer, the term of this patent is extended or adjusted under 35 U.S.C. 154(b) by 1417 days.

(21) Appl. No.: 11/585,612

(22) Filed: Oct. 24, 2006

(65) Prior Publication Data

US 2008/0077680 A1 Mar. 27, 2008

(30) Foreign Application Priority Data

Aug. 31, 2006 (EP) .................................... 06425602
Aug. 31, 2006 (IT) .............................. MI2006A1666

(51) Int. Cl.
*H04M 3/42* (2006.01)
(52) U.S. Cl. .................. 379/201.12; 709/225
(58) Field of Classification Search ............ 379/201.12; 709/225; 705/34
See application file for complete search history.

(56) References Cited

U.S. PATENT DOCUMENTS

| 6,026,424 | A | 2/2000 | Circenis |
| 6,076,093 | A | 6/2000 | Pickering |
| 6,263,370 | B1 | 7/2001 | Kirchner et al. |
| 6,453,356 | B1 | 9/2002 | Sheard et al. |
| 6,775,262 | B1 | 8/2004 | Skog et al. |
| 6,910,074 | B1 | 6/2005 | Amin et al. |
| 7,140,025 | B1 | 11/2006 | Dillow et al. |
| 7,222,088 | B2 | 5/2007 | Nishikado et al. |
| 7,552,323 | B2 | 6/2009 | Shay |
| 2002/0035617 | A1 | 3/2002 | Lynch et al. |
| 2002/0156874 | A1 | 10/2002 | Suorsa et al. |
| 2002/0168962 | A1 | 11/2002 | Kurakake et al. |
| 2003/0065777 | A1 | 4/2003 | Mattila et al. |
| 2004/0015366 | A1 | 1/2004 | Wiseman et al. |
| 2004/0088417 | A1 | 5/2004 | Bober et al. |
| 2004/0111506 | A1 | 6/2004 | Kundu et al. |
| 2004/0133486 | A1 | 7/2004 | Markki et al. |
| 2004/0133487 | A1* | 7/2004 | Hanagan et al. ................ 705/34 |
| 2004/0139166 | A1 | 7/2004 | Collison |
| 2004/0153404 | A1 | 8/2004 | Rischmueller et al. |

(Continued)

FOREIGN PATENT DOCUMENTS

EP 0980175 A2 6/2000

(Continued)

OTHER PUBLICATIONS

Nokia "Parameters in Subscriber Certificate and Subscriber Profile Supporting Operator Control and Service Differentiation", 4pp., 3GPP TSG SA WG 3 Security, Feb. 25-28, 2003, Sophia Antipolis, France.

(Continued)

*Primary Examiner* — Quynh Nguyen
(74) *Attorney, Agent, or Firm* — Brinks Hofer Gilson & Lione (57) ABSTRACT

A request management and workflow engine for a communications system is disclosed that may include a provisioning service order engine and a provisioning network engine. The provisioning service order engine may process the service order according with a defined and configured workflow and generate a service order result reflecting the result of the activation and provisioning of the services on the network. The provisioning network engine may manage the provisioning of the services into the network generating the expected network command specific for the services to be provisioned.

13 Claims, 10 Drawing Sheets

U.S. PATENT DOCUMENTS

| | | | |
|---|---|---|---|
| 2004/0249910 | A1 | 12/2004 | Jerbi et al. |
| 2005/0091370 | A1 | 4/2005 | Wietfeld |
| 2005/0149724 | A1 | 7/2005 | Graff |
| 2005/0160135 | A1 | 7/2005 | Yokoro |
| 2005/0165930 | A1 | 7/2005 | Whitman |
| 2005/0185661 | A1 | 8/2005 | Scott et al. |
| 2005/0223064 | A1 | 10/2005 | Salerno et al. |
| 2006/0075102 | A1* | 4/2006 | Cupit ............................ 709/225 |
| 2006/0101474 | A1 | 5/2006 | Magown |
| 2006/0209768 | A1 | 9/2006 | Yan et al. |
| 2007/0050340 | A1 | 3/2007 | von Kaenel et al. |
| 2007/0118648 | A1* | 5/2007 | Millefiorini et al. .......... 709/225 |
| 2007/0240046 | A1 | 10/2007 | Yan et al. |

FOREIGN PATENT DOCUMENTS

| | | |
|---|---|---|
| EP | 1 052 841 A2 | 11/2000 |
| EP | 1 418 743 A1 | 5/2004 |
| JP | 2002-140309 A | 5/2002 |
| JP | 2003-060714 A | 2/2003 |
| JP | 2004-266310 A | 9/2004 |
| JP | 2005-202631 | 7/2005 |
| JP | 2006-504297 A | 2/2006 |
| JP | 2006-510328 A | 3/2006 |
| WO | WO 02/091194 | 11/2002 |
| WO | WO 03/025809 A2 | 3/2003 |

OTHER PUBLICATIONS

Dr. Bert Dempsey and Dr. Matthew Lucas, "IPDR Update: Standards Effort Moves From Usage to Provisioning", pp. 44-48, TelOSSource Magazine, Apr. 2000.

Sun Microsystems, Chapter 8, Authentication Options, Sun Java System Access Manager 6 2005Q1 Adminstration Guide, Sun Microsystems, pp. 1-25, Mar. 2005.

Opencon, "White Paper on Billing for the New Public Network", pp. 1-5, OpenCon Systems, Inc., www.opencon.com, 2000.

The Parlay Group, Inc., The Parlay Goup: Web Services Working Group, "Parlay Web Services Application Deployment Infrastructure", pp. 1-21, Version 1.0, Oct. 31, 2002.

Michel L.F. Grech et al., "Delivering Searmless Services in Open Networks Using Intelligent Service Mediation", pp. 186-202, Bell Labs Technical Journal, Jul.-Sep. 2000.

Indian Examination Report, dated Sep. 29, 2008, Indian Patent App. No. 1722/MUM/2006.

EPO Examination Report, dated May 19, 2006, EP Pat. No. 05425821.5.

EPO Examination Report, dated May 10, 2006, EP Pat. No. 05425824.9.

Silver et al., "Unified Network Presence Management," White Paper Nortel Networks, 2000, 6 pages.

Anonymous, "3GPP; Technical Specification Group Services and Systems Aspects; Presence Service, Architecture and Functional Description," 3GPP TS 23.141 V6.0.0, Oct. 2002, 31 pages.

Livingston et al., "Remote Authentication Dial in User Service (RADIUS)," Radius Working Group, Internet-Draft, Feb. 2000, 80 pages.

Droms, "Dynamic Host Configuration Protocol," Oct. 2003, available from http://www.ietf.org/rfc1541.txt, 40 pages.

The prosecution history of U.S. Appl. No. 11/313,441 shown in the attached Patent Application Retrieval file wrapper document list, printed Nov. 13, 2008, including each substantive communication.

The prosecution history of U.S. Appl. No. 11/313,463 shown in the attached Patent Application Retrieval file wrapper document list, printed Nov. 13, 2008, including each substantive communication.

The prosecution history of U.S. Appl. No. 11/313,496 shown in the attached Patent Application Retrieval file wrapper document list, printed Nov. 13, 2008. including each substantive communication.

The prosecution history of U.S. Appl. No. 11/314,576 shown in the attached Patent Application Retrieval file wrapper document list, printed Nov. 13, 2008, including each substantive communication.

The prosecution history of U.S. Appl. No. 11/314,577 shown in the attached Patent Application Retrieval file wrapper document list, printed Dec. 11, 2008, including each substantive communication.

The prosecution history of U.S. Appl. No. 11/313,497 shown on the attached Patent Application Retrieval file wrapper document list, printed Oct. 21, 2010, including each substantive communication.

Japanese Office Acton and English Translation from corresponding JP application No. 2006-319265, Dispatch Date Sep. 16, 2008, 7pgs.

Japanese Office Action and English Translation from corresponding JP application No. JP 2006-284334, Dispatch Date Jan. 25, 2010, 5pgs.

European Office Action from corresponding EP application No. 05425657.3, dated Oct. 8, 2010, 4pgs.

European Examination Report from corresponding European Patent Application No. 06 425 602.7, 5pp., dated Sep. 7, 2011.

European Search Report from corresponding European Patent Application No. 06425602.7; 8 pgs.; dated Nov. 24, 2006.

* cited by examiner

SERVICE PROVISIONING AND ACTIVATION ENGINES FOR SYSTEM

PRIORITY CLAIM

This application claims the benefit of EPO Application No. 06425602.7, filed Aug. 31, 2006 and Italian Application No. MI2006A001666, filed Aug. 31, 2006, both of which are incorporated herein by reference in their entirety.

TECHNICAL FIELD

Generally service engines are disclosed for provisioning service logic and network integration of a service provisioning and activation platform.

BACKGROUND

Telecommunication service provisioning and activation systems, such as those that provision voice, data and/or video, are constantly evolving to fulfill the market request in a very competitive environment. Many provisioning and service activation systems today have been built for a few services and for specific network technology, and may require the coding of new adapters as new network elements are added to the system. Provisioning of new services may also require coding of new service logic to fulfill the activation of those services toward the network.

BRIEF SUMMARY

A method, system, engine and tool are disclosed for service provisioning and activation. A provisioning service order engine may process the service order according with a defined and configured workflow and generate a service order result reflecting the result of the activation and provisioning of the services on the network. A provisioning network engine may manage the provisioning of the services into the network generating the expected network command specific for the services to be provisioned.

Other systems, methods, tools, engines, features and advantages will be, or will become, apparent to one with skill in the art upon examination of the following figures and detailed description. It is intended that all such additional systems, methods, features and advantages be included within this description, be within the scope of the invention, and be protected by the following claims.

DETAILED DESCRIPTION

A service provisioning and activation system is described. The system may reside in a communication IT stack which activates and provisions a service requested by a subscriber on a communication network of a service provider. The service provisioning and activation system may include component layers: such as upstream system interfaces, service logic and network interfaces. The availability of a provisioning service order engine and a provisioning network engine may shift a complexity of a provisioning service logic implementation and workflow definition from a coding based matter to a pure configuration matter. This may allow reduced effort and time requested by the implementation, or maintenance of the provisioning service logic. A provisioning network engine may simplify the integration with a network layer reducing the effort and the time requested by the implementation or maintenance of integration with the Network. The provisioning service order engine and provisioning network engine may provide an overall reduction in the implementation/maintenance cost, risk and timeframe requested by the implementation and modification/enhancement of the service provisioning and activation system for a communication operator.

Figure 1:
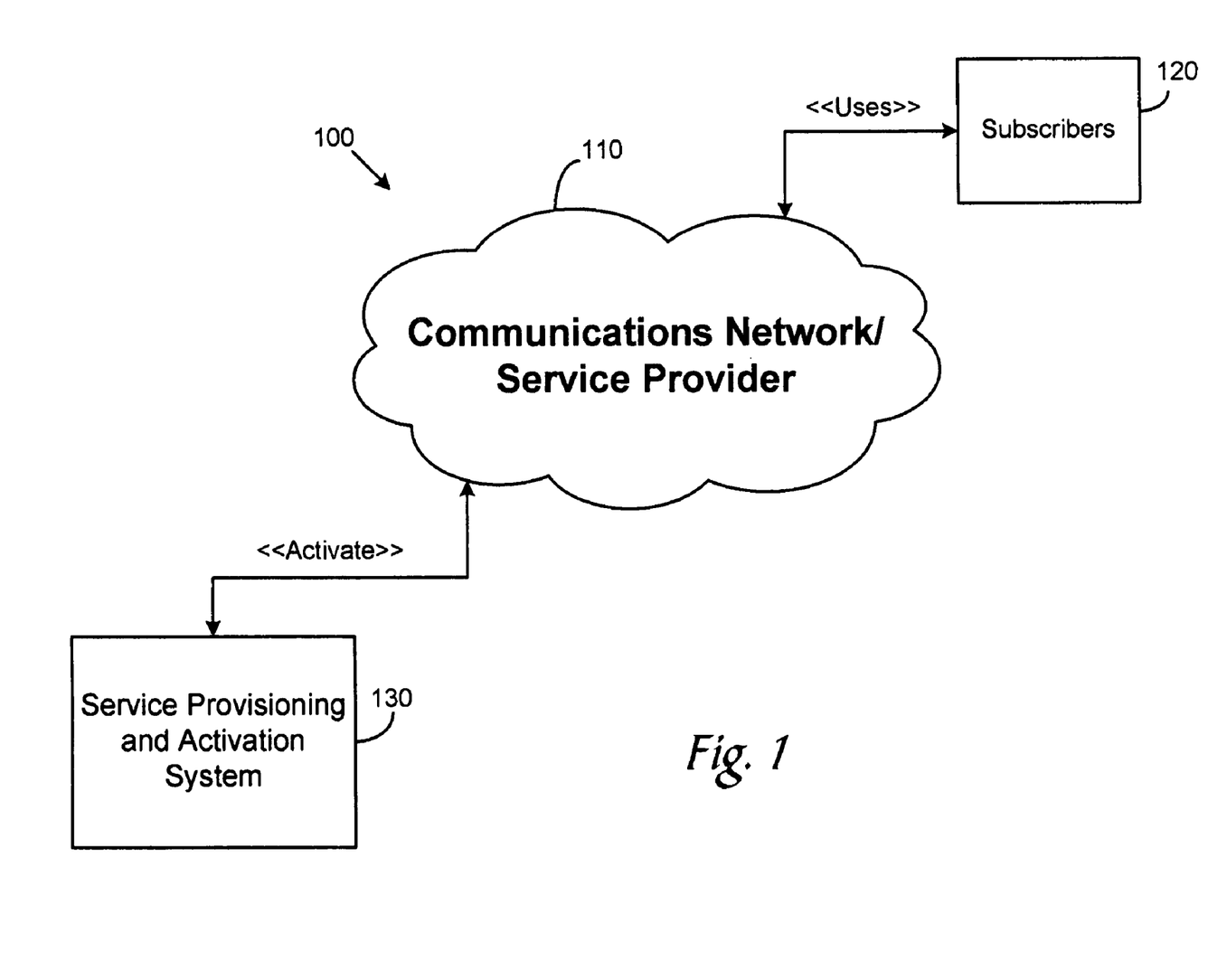
FIG. 1 is a block diagram of a communications system.

FIG. 1 is a block diagram of a communications system 100. The communication system 100 may include a service provisioning and activation system 130 for a communications operator. A communications network 110 may provide services, such as voice, data, short message service (SMS) and/or video communications, messaging etc. to be used by subscribers 120. The communications network 110 may be provided by and maintained by service providers and operators to allow the subscribers 120 to use the services provided by the communications network 110. The subscribers may utilize those services to communicate with other subscribers using devices such as phones used with landlines, mobile phones, satellite phones, BLACKBERRY's, personal digital assistants (PDS's), game counsels, and the like such as computers. The service provisioning and activation system 130 is a system which activates and provisions those services for the subscriber 120 on the communication network 110.

The communications network 110 may include local area networks (LANs) and wide area networks (WANs), such as the Internet. The communications network 110 may include signal bearing mediums that may be controlled by software, applications and/or logic. The communications network 110 may include a combination of network elements to support voice, data, or video services in local or long-distance applications. The communications network 110 may connect the subscribers 120 to virtually anywhere in the world through the use of copper cable, coaxial cable, and fiber cable—or through wireless technology such as microwave or satellite.

The communications network 110 may operate with a service logic that allows operators to administer many numbers of switches in the network and to provide numerous and ever changing services to the subscribers 120. The communication system 100 may include a service provisioning and activation system 130 which connects with the communications network 110 to help provide, modify and change services to the communications network 110. The service provisioning and activation system 130 may be used to help design and build the communications network 110 of packaged or customized architectures or applications, and may be used to help integrate new or existing hardware, packaged and custom software, and communications throughout the communications network 110.

Figure 2:
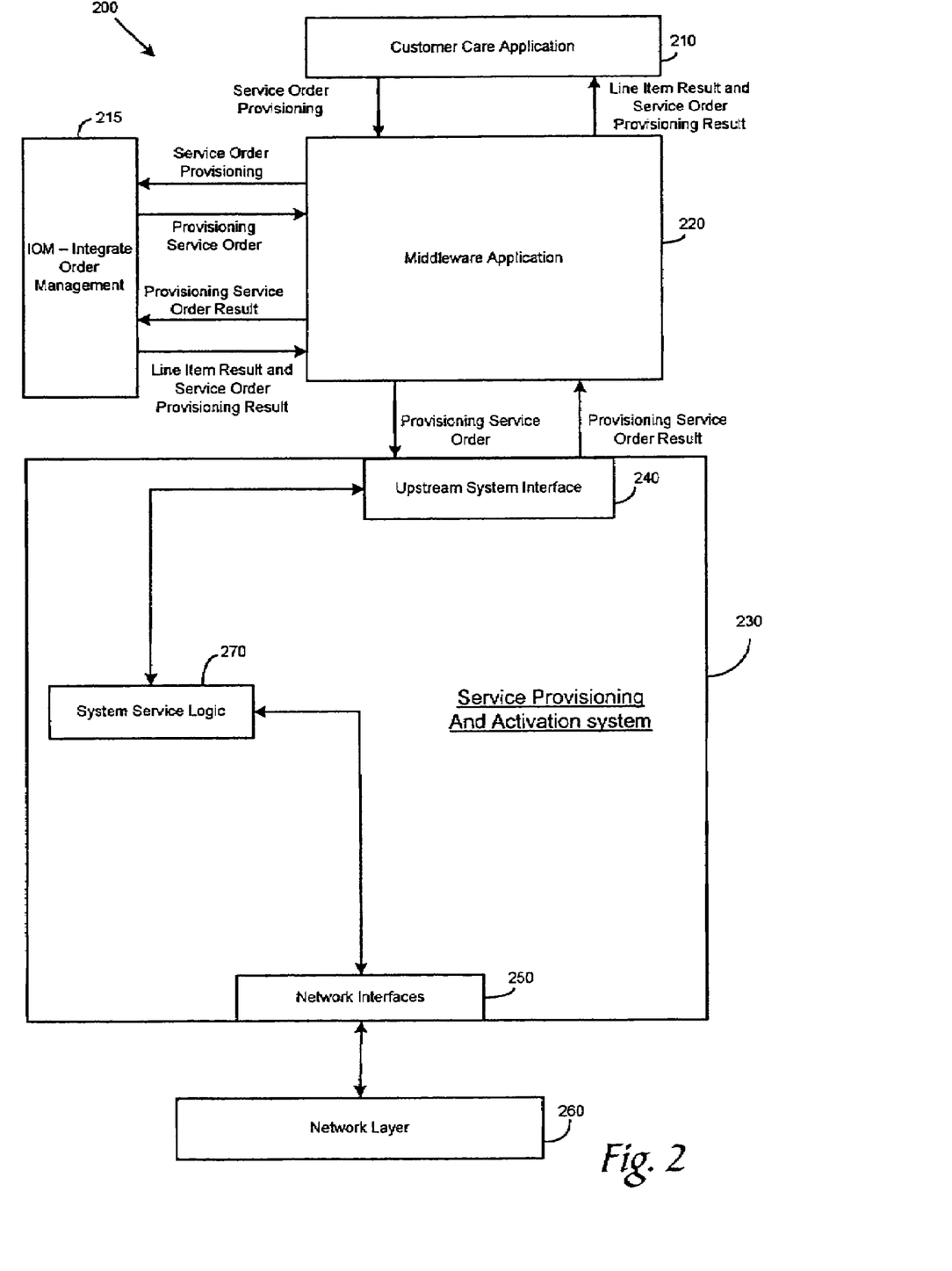
FIG. 2 is a block diagram of communications ordering and service provisioning systems.

FIG. 2 a block diagram of communications ordering and service provisioning system 200 that may be implemented by one or more software applications. The system 200 may be an end-to-end (E2E) system to exchange information between website applications, such as via the Internet, in such a way that each application can originate a direct connection to the other. The applications may fulfill the business and technical capabilities of a service provider/communication operator such as an E2E framework, such as ACCENTURE COMMUNICATIONS SOLUTIONS, manufactured by ACCENTURE, or other framework which provides an integrated framework of BSS (Business Support System) and OSS (Operation Support System) capabilities and systems. The system 200 may include a customer care application 210, such as an eBusiness customer relationship management (CRM) application manufactured by SIEBEL. The customer care application 210, which includes order capabilities, may also be used for monitoring, managing, and analyzing customer interactions and relationships over a lifecycle of the customer.

The customer care application 210 may send a service order provisioning event to an order management application 215, such as an integrated order management (IOM) system, via a middleware application 220. The middleware application 220 may be implemented with Accenture Communications Solutions for IOM manufactured by ACCENTURE over a BIZTALK SERVER manufactured by MICROSOFT. The middleware application 220 may include enterprise application integration (EAI) to act as a bus to manage the data communication, integration and transformation. The middleware application 220 receives the service order provisioning event from the customer care application 210 and dispatches the service order provisioning event to the IOM 215. The IOM 215 decomposes the service order provisioning event into a set of provisioning service order to be provisioned and sends it to the service provisioning and activation system 230 through the middleware application 220. Once the service provisioning and activation system completes the provisioning of the provisioning service order, returns to IOM through the middleware application the service provisioning and activation result. The IOM 215 returns to the customer care application through the middleware application 220 the line item result including the result of the service provisioned and, depending on that result, continue to send the remaining provisioning service order, through the middleware application 220, to provisioning following the workflow defined in the IOM application. Once the provisioning service orders are completed on service provisioning and activation system, the IOM returns to the customer care application 210, through the middleware application 220, the service order provisioning result.

The service provisioning and activation system 230 may be implemented with TERTIO, manufactured by EVOLVING SYSTEMS, Inc. headquartered in Englewood, Colo., or other custom off-the shelf applications that may allow operators to activate and provision the services towards the communications network. The service provisioning and activation system 230 generally includes a three layer architecture including an upstream system interface 240 for the integration with the upstream system, such as a customer care application and/or order management, through middleware application 220, a service logic layer 270 for the management of the provisioning of the service order (service order decomposition, workflow management, error handling, etc.) and a network interface layer 250 for the integration with the network layer. The network layer 260 may include, but is not limited to, the network element to provision wireline and wireless services, such as 2G, 2.5G and 3G generation services, prepaid and postpaid subscribers, consumer and corporate subscribers. Regarding wireless services, the services to be provisioned includes, but are not limited to, voice, data, facsimile, short message service (SMS), general packet radio service (GPRS), e-mail, wireless application protocol (WAP), multimedia message service (MMS), and voicemail service.

Figure 3:
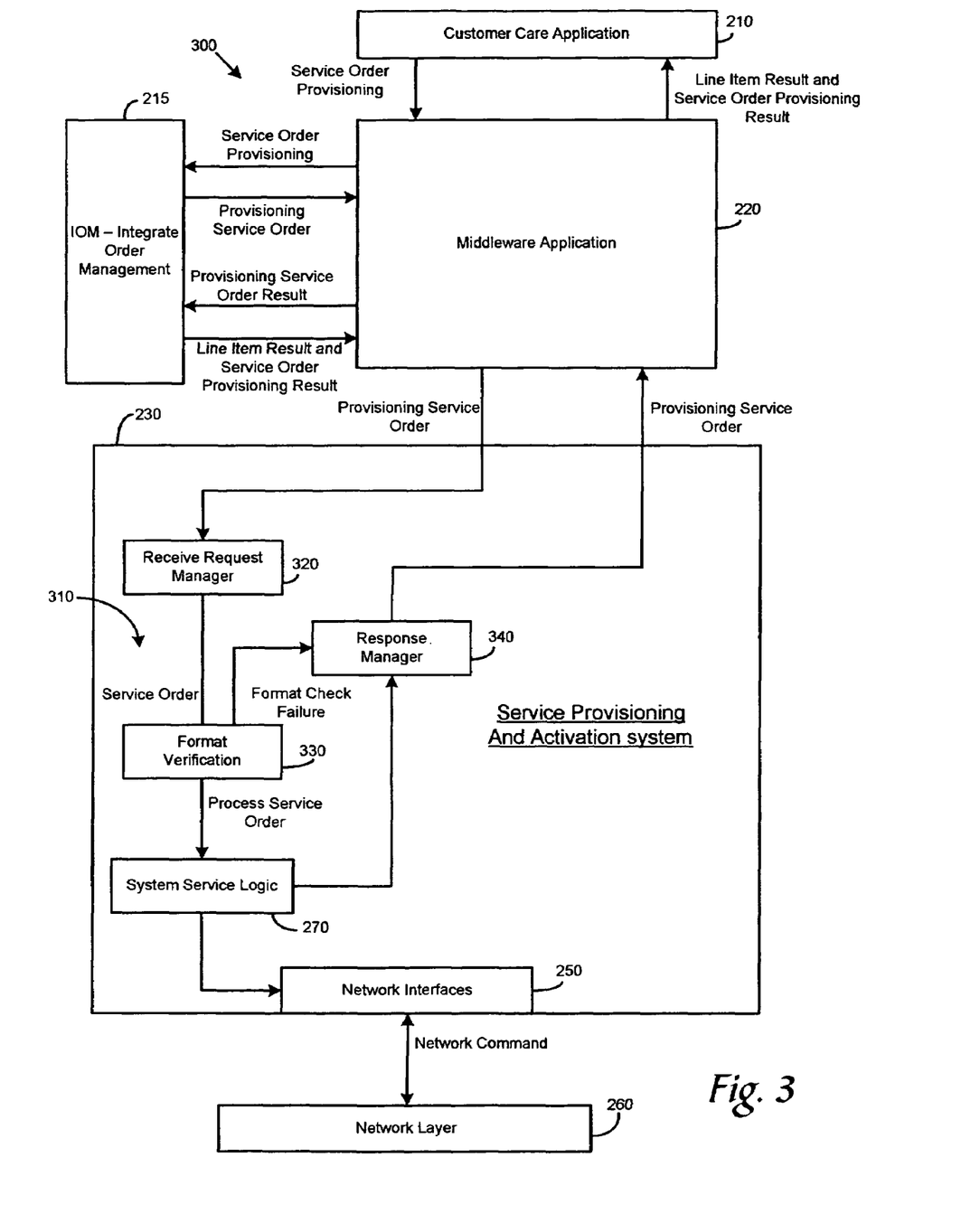
FIG. 3 is a block diagram of a communications ordering and service provisioning system including a detailed architecture of the upstream system interface.

FIG. 3 is a block diagram of a communications ordering and service provisioning system 300 including a detailed architecture of the upstream system interface of the service provisioning and activation system. The upstream system interface 240 may be implemented with an order management application 310. The system 300 may be an end-to-end (E2E) system. The upstream system interface 310 manages the integration of the service provisioning and activation system with the upstream system through the middleware application 220 through the receive request manager 320 which is the module that receives the service order from middleware application 220 and through the response manager 340, e.g., the module that returns the provisioning service order result to middleware application. Upstream system interface 310 also manages the validation of the provisioning service order performing a formal check before sending the valid provisioning service order to the system service logic 270. The format verification module 330 validates the form of the service order received from the receive request manager 320 based on the configured validation rules defined for each provisioning service order type.

Figure 4:
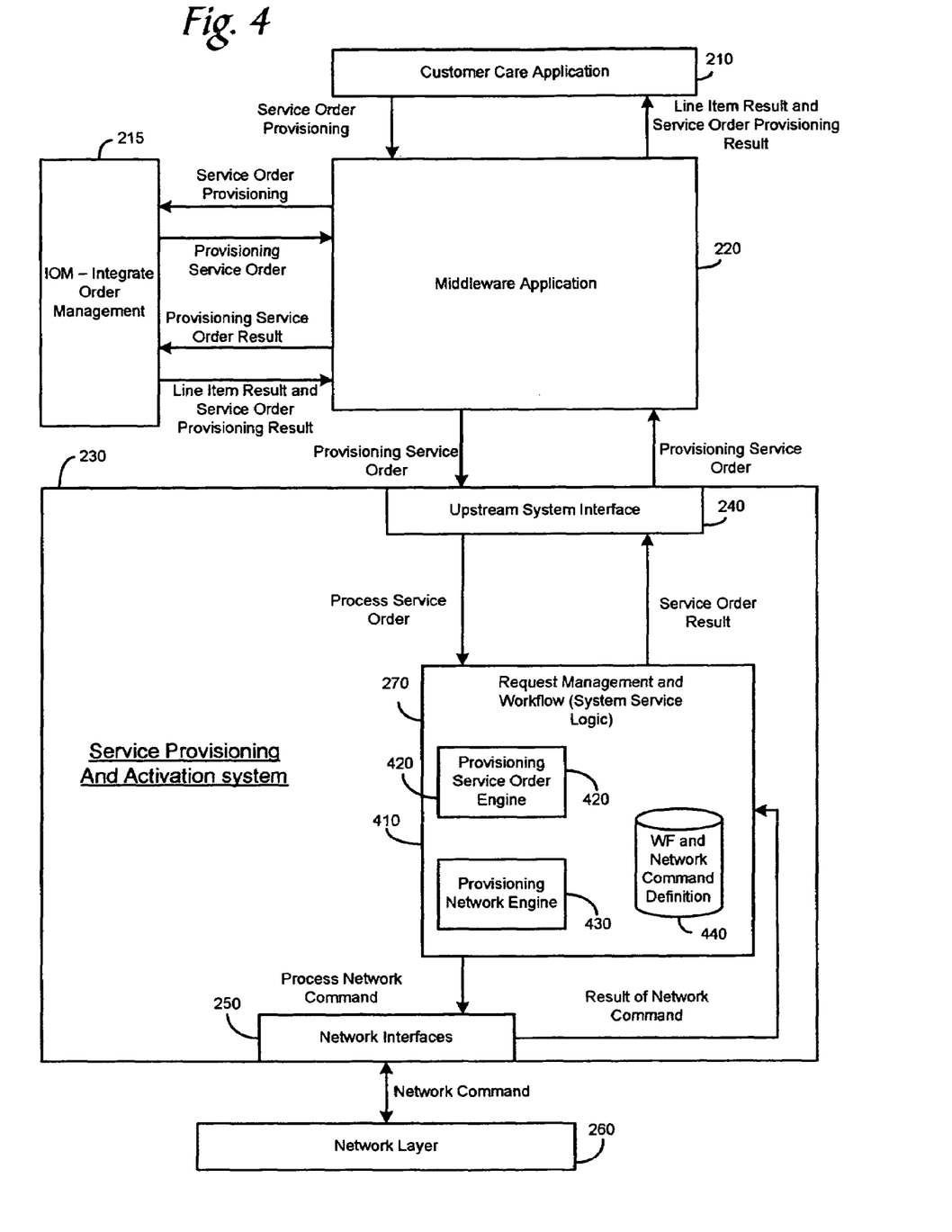
FIG. 4 is a block diagram of a communications ordering and service provisioning system including a detailed architecture of the system service logic.

FIG. 4 is a block diagram of a communications ordering and service provisioning system including a detailed architecture of the system service logic 270 of the Service Provisioning and Activation System being implemented with a provisioning service order engine 420 and a provisioning network engine 430. A request management and workflow engine 410 receives provisioning service orders from the upstream system interface 240 and sends the provisioning service order results to the upstream system interface 240 reflecting the provisioning of the services on the network. The request management and workflow engine 410 is also able to send network commands to the network through the network interfaces 250.

The request management and workflow engine 410 may include a provisioning service order engine 420 and a provisioning network engine 430. The provisioning service order engine 420 provides the logic to manage the workflow needed for the provisioning of the services included into a provisioning service order. The provisioning network engine 430 manages the network commands actions and their workflow to the network layer. The workflow and network command definition 440 provides a set of meta-tables which includes data for validation for the provisioning service order (keys, service element to be provisioned, etc.), workflow definition, network command definition, network command workflow and virtual services/network command to be sent to the network layer 260 for the provision and activation of the services included in a provisioning service order toward the network layer 260.

Figure 5:
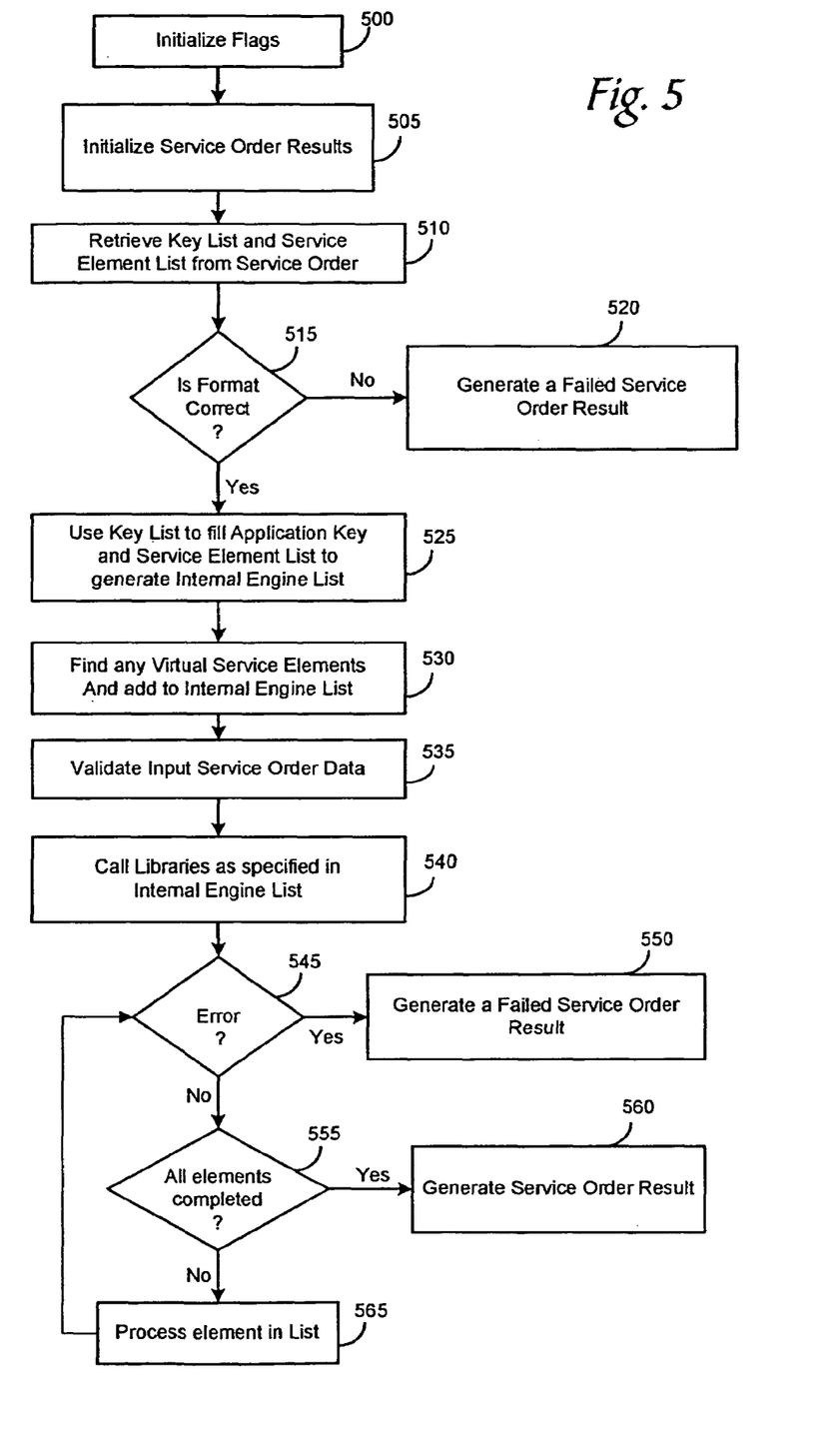
FIG. 5 is a flowchart of an exemplary logic of the provisioning service order engine.

FIG. 5 is a flowchart of an exemplary logic of the provisioning service order engine 420. The logic may be implemented with hardware, software, firmware or any combination of them. At block 500, the logic may initialize flags used to control the service order task. At block 505, the logic may initialize the service order results. At block 510, key lists and service element lists are retrieved for the service order. At block 515, the logic may determine if the format is correct. Information regarding the formats may be stored in memory and organized by libraries.

Figure 6:
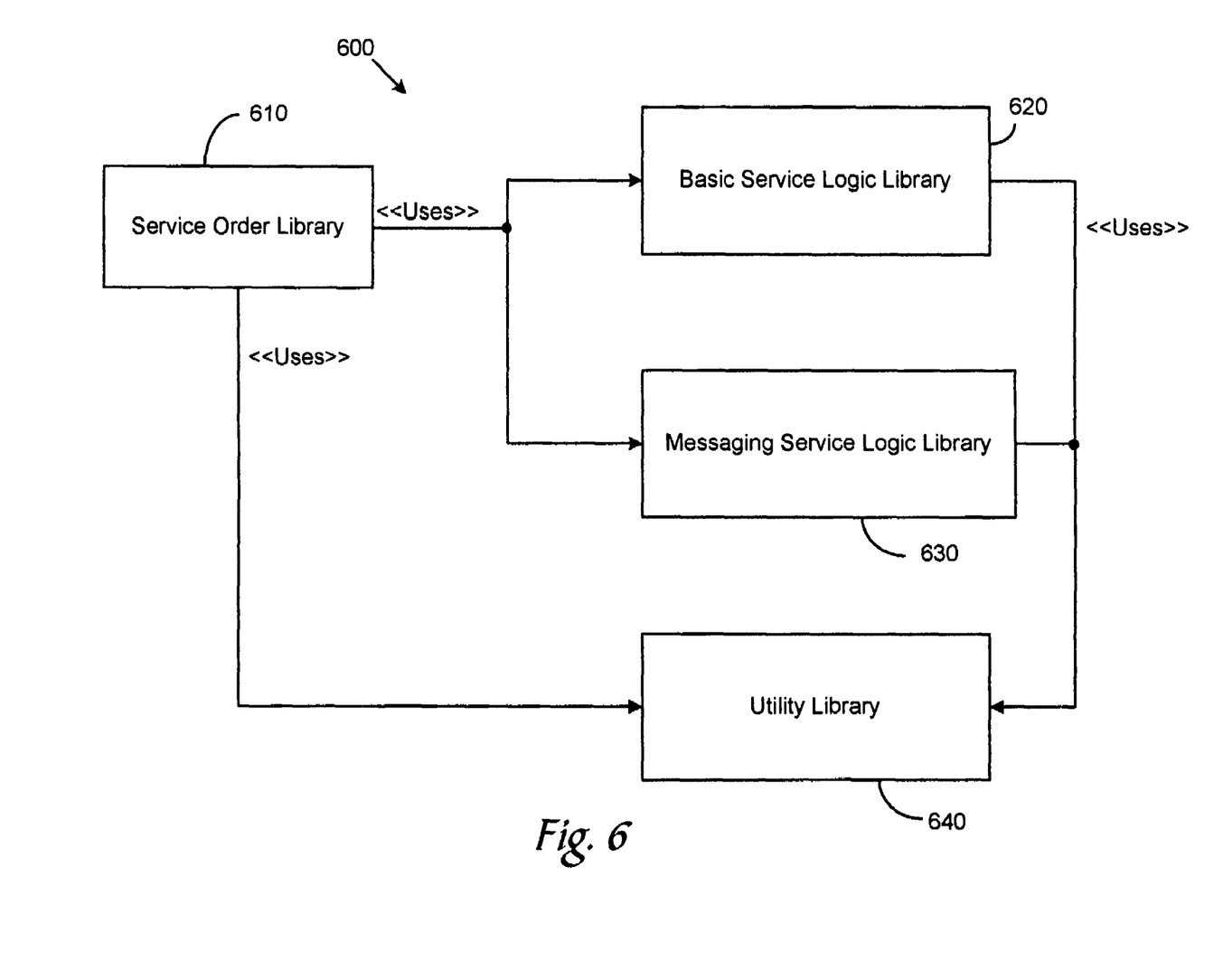
FIG. 6 is a block diagram of an exemplary library format.

FIG. 6 is a block diagram of an exemplary library format 600. A service order library 610 may contain the templates of the service orders defined to support the provisioning capabilities for the order and billing application 210, such as Accenture Communications Solutions. The service order library may include functions for adding, modifying, suspending, resuming and terminating services. The service order library 610 may have access to use a basic service logic library 620 and a messaging service logic library 630, described in more detail below. The basic service logic library 620 may contain modules that provision service elements for a basic service category. The messaging service logic library 630 may contain modules that provision service elements for a messaging service category. Basic services may include CORE network bearer services, such as Voice, Data, Fax, etc. Messaging services may include email, voice mail, MMS, etc. Based on an implementation, the basic and messaging services may be combined into a single library or parsed in different ways. A utility library 640 may provides general capabilities and functions to be used by the other libraries, for example as TCL scripts for use by the other libraries.

In FIG. 5, at block 520, if the format is not correct, the service order task may generate a failed service order result. If this occurs, the service provisioning and activation system 230 returns to middleware application 220 a failed Provisioning Service Order Result. At block 525, if the format is correct, the key list is used to fill the application key and the service element list is used to generate an internal engine list. At block 530, any virtual service elements that are found are added to the internal engine list. The virtual service element may be a list of services requested by the network but not specified or managed by CRM. Those services are called virtual since provisioning need also to activate and provision those to provision the services requested by CRM. At block 535, the input service order data may be validated. Data validation in the service order engine may include validating that all mandatory keys are present and no unexpected keys exist, validating that the key values are compliant with defined ranges, list and types, and validating that all mandatory service elements are present and no unexpected service elements exist. The checks may be accomplished by calling the utility library 540.

At block 540, libraries, such as the libraries in FIG. 5, are called as specified by the service order provisioning workflow configured for the specific Provisioning Service Order type to be provisioned. The logic attempts to complete the provisioning of all of the service elements defined by the workflow in the engine list. At block 545, the logic may determine if an error occurs during this provisioning process. An error may occur, for example, if there is a wrong configuration or a service element provisioning failed on the Network. At block 550, if an error occurs, a failed service order result is generated. At block 555, the logic may determine if all of the elements have been completed. At block 565, if all of the elements have not been completed, the next element is processed. If an error occurs, the process ends and this may generate a Failure Service Order Provisioning Result. In case of no errors occurred during the provisioning of the service element included in the engine list, a successful Provisioning Service Order Result may be generated.

Figure 7:
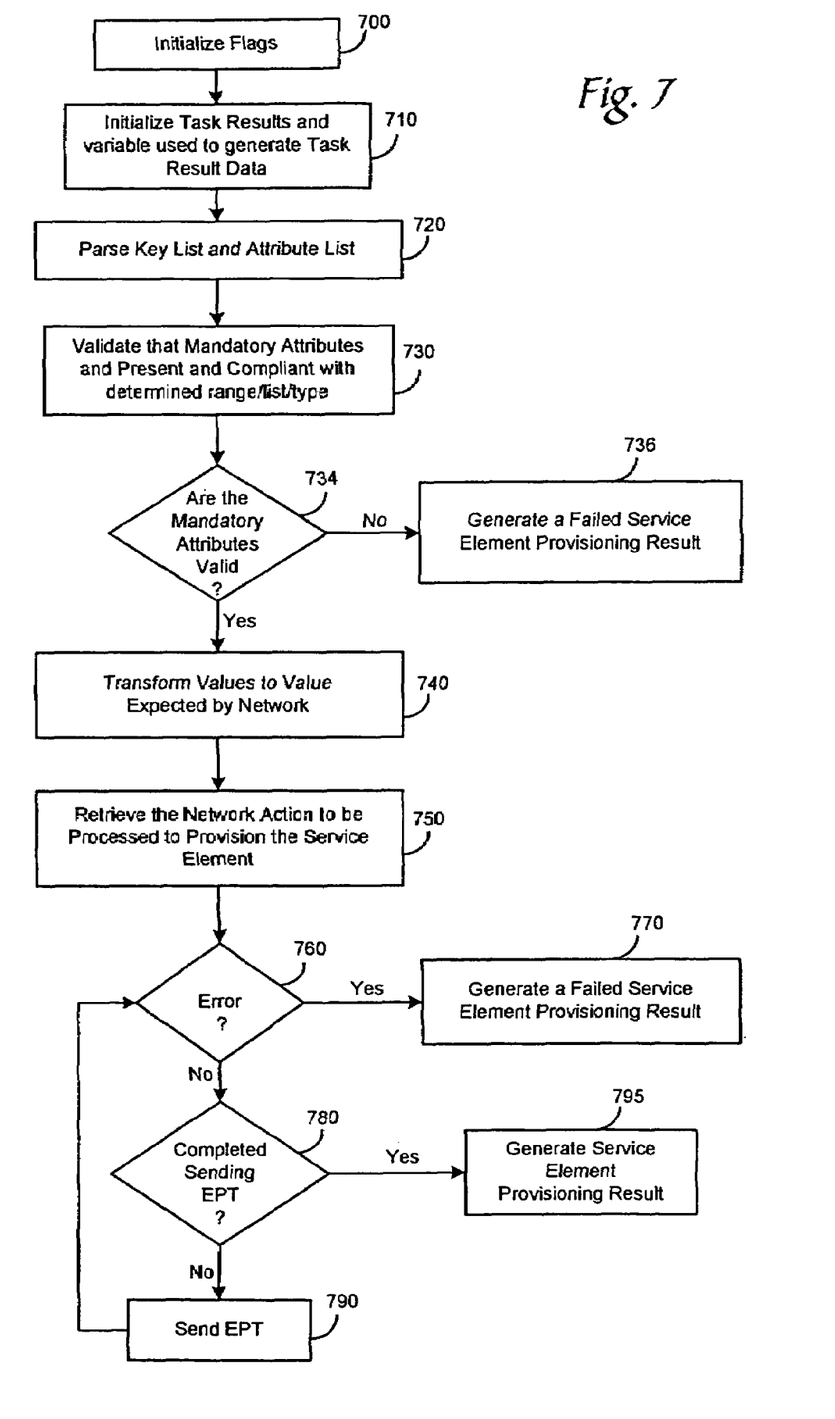
FIG. 7 is a flowchart of an exemplary logic of the provisioning network engine.

FIG. 7 is a flowchart of an exemplary logic of the provisioning network engine 430. The provisioning network engine 430 dynamically composes a sequence of network command to be processed toward the network. At block 700, flags to control the service order task are initialized. At block 710, the logic initializes a task result variable and other variables used to generate task result data to be returned as a result of the service logic task. At block 720, the key list and the attribute lists are parsed. The parsing may be customized for each specific service logic task. At block 730, the logic validates that the mandatory attributes are present and compliant within a determined range/list/type. At block 734, the logic determines is the mandatory attributes are valid. If the mandatory attributes are not valid, at block 736, the logic generates a failed service element provisioning result. The failed service element provisioning managed by the provisioning service order engines according with the error handling rules configured in the service order provisioning workflow. At block 740, if the mandatory attributes are valid, the logic accesses the meta-table to transform variables to a value expected by the network. The logic may be customized for each service logic library or Network Element to be provisioned.

At block 750, the logic retrieves the network action to be processed to provision the service element. At block 760, the logic determines if an error has occurred in completing the network actions. At block 770, if an error occurs, a service element provisioning result is generated. At block 780, the logic determines if all of the EPT's have been sent. At block 790, The UL is called to send the EPT's until all of the EPT's have been sent. The SLE is read in order to obtain necessary data to send to the EPT. At block 795, after all the EPT's are sent, the logic generates a service element provisioning result. The task result data may then be sent to the upstream system interface.

Figure 8:
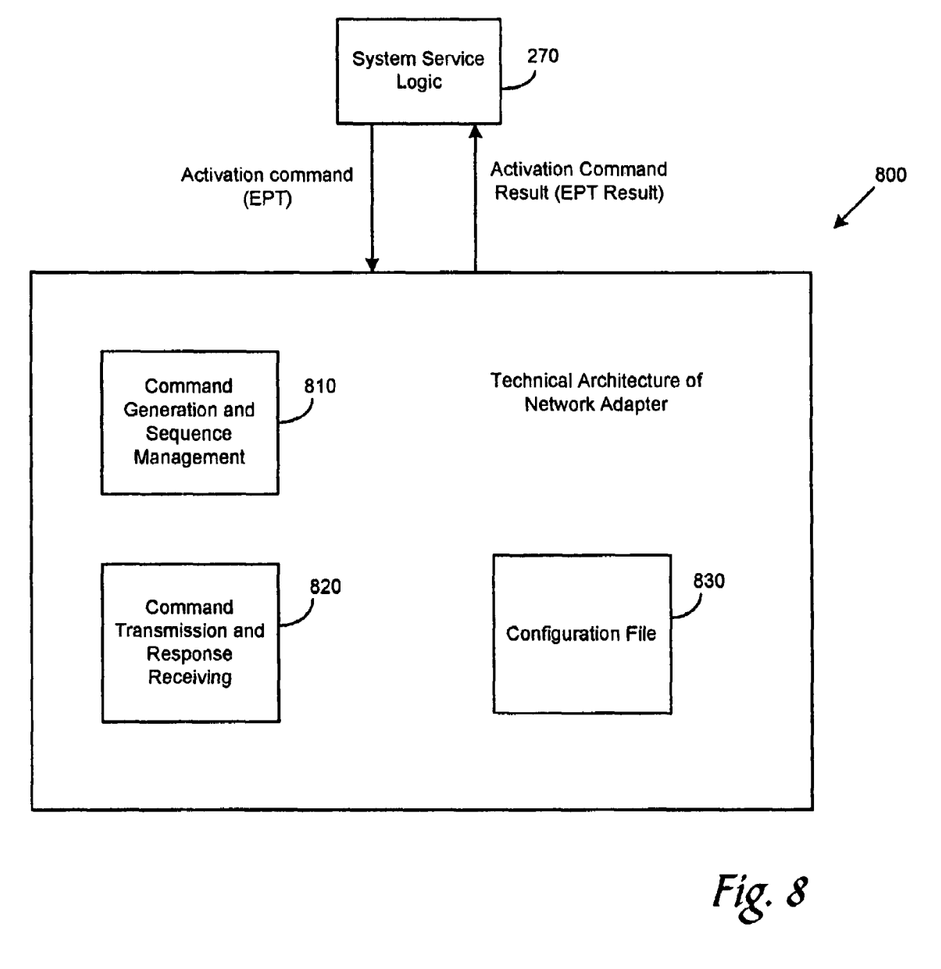
FIG. 8 is a block diagram of an exemplary detailed architecture of the network interface.

FIG. 8 is a block diagram of network interface 250 implemented by exemplary network interface 800. The system service logic 270 connects with the network interface 800. The network interface 800 may include a command generation and sequence management module 810, a command transmission and response receiving module 820 and a configuration file 830. The network interface 800 may be implemented with a network adapter, such as an ERICSSON SOG adapter or other Network Element interfaces. The command generation and sequence management 810 may include rule-based command generation and command sequencing to provide a set of network commands, like a library to be used by provisioning network engine 430 for the provisioning of the service on a specific network element. The command transmission and response receiving 820 may include communication protocol, communication and session handling, service commands sending and response receiving, and command-level retries. This may be utilized to provide a set of network commands, like a library to the used by provisioning network engine 430 for the provisioning of the service on a specific network element. The configuration file 830 contains all the specific validation, rules and transformation for the network element to be integrated. This may be specific by the network element, model, or vendor. For example ERICSSON HLR is different from NOKIA HLR, etc.

Figure 9:
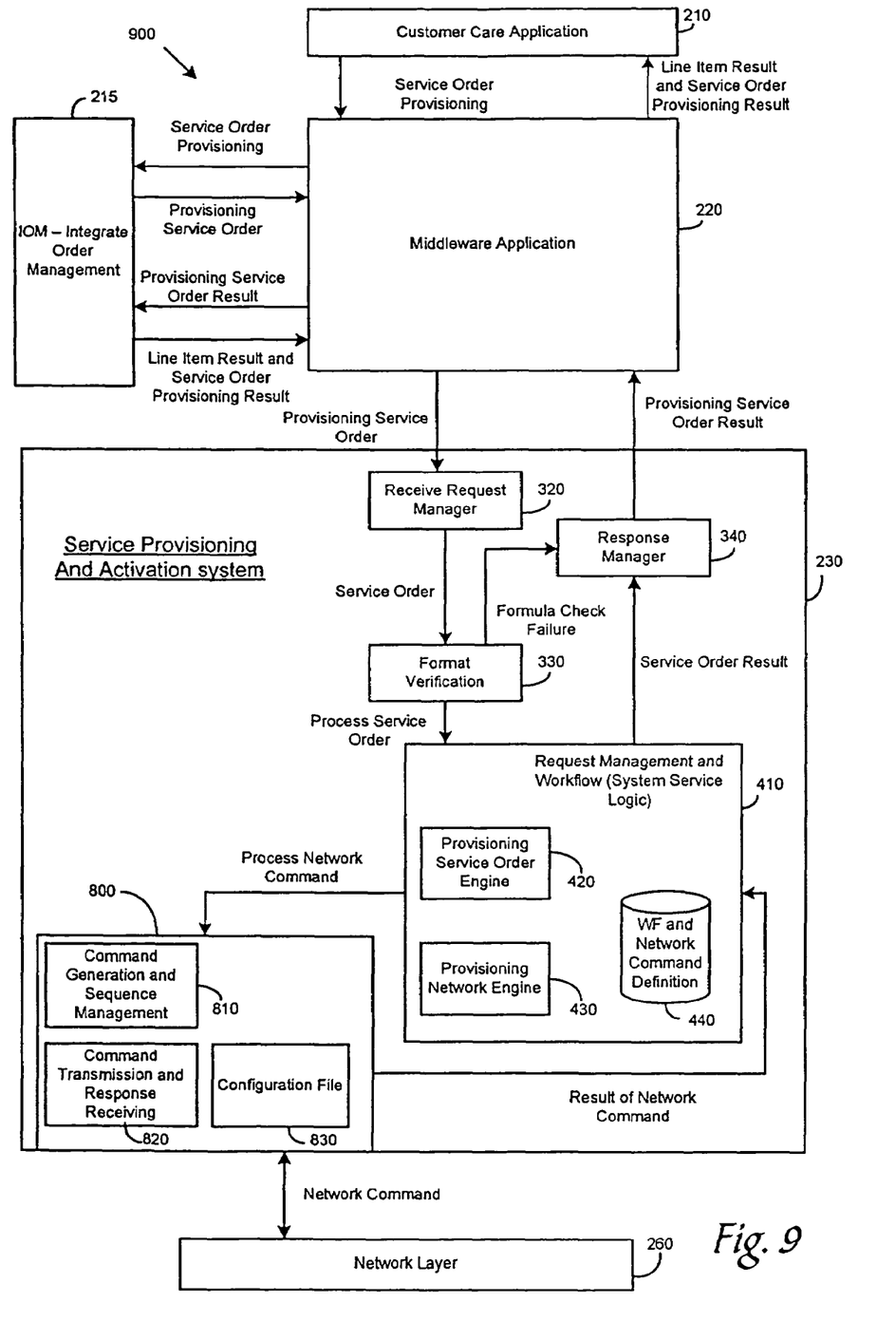
FIG. 9 is a block diagram of a communications ordering system including both an order management application and the request management and workflow engine.

FIG. 9 is a block diagram of an E2E communications ordering and service provisioning systems including the detailed architecture of the Service Provisioning and Activation system being implemented with the Provisioning Service Order engine and the Provisioning Network engine.

Figure 10:
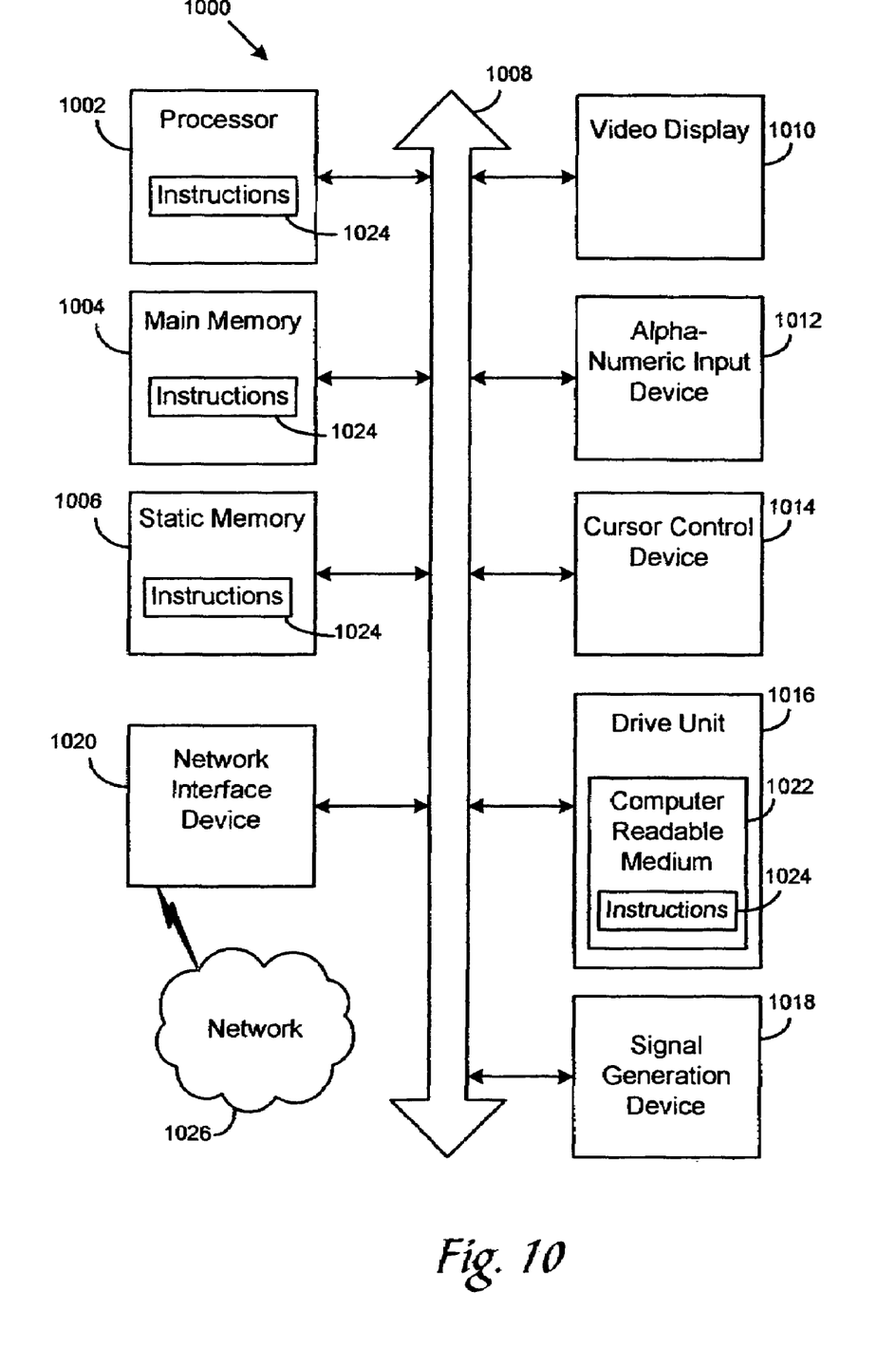
FIG. 10 is a block diagram of an exemplary computer system that may be used in the communications system to run the service provisioning and activation system.

FIG. 10 is a block diagram of an exemplary computer system 1000 that may be used in the communications system 100 to run the service provisioning and activation system. The computer system 1000 may include a set of instructions that can be executed to cause the computer system 1000 to perform any one or more of the methods or computer based functions disclosed herein. The computer system 1000 may operate as a standalone device or may be connected, e.g., using a network, to other computer systems or peripheral devices. The communications system 100 may be implemented hardware, software or firmware, or any combination thereof. Alternative software implementations may be used including, but not limited to, distributed processing or component/object distributed processing, parallel processing, or virtual machine processing may also be constructed to implement the tools described herein.

In a networked deployment, the computer system 1000 may operate in the capacity of a server or as a client user computer in a server-client user network environment, or as a peer computer system in a peer-to-peer (or distributed) network environment. The computer system 1000 may also be implemented as or incorporated into various devices, such as a personal computer (PC), a tablet PC, a set-top box (STB), a personal digital assistant (PDA), a mobile device, a palmtop computer, a laptop computer, a desktop computer, a communications device, or any other machine capable of executing a set of instructions (sequential or otherwise) that specify actions to be taken by that machine. The computer system 1000 may be implemented using electronic devices that provide voice, video or data communication. Further, while a single computer system 1000 is illustrated, the term "system" shall also be taken to include any collection of systems or sub-systems that individually or jointly execute a set, or multiple sets, of instructions to perform one or more computer functions.

In FIG. 10, the computer system 1000 may include a processor 1002, e.g., a central processing unit (CPU), a graphics processing unit (GPU), or both. Moreover, the computer system 1000 may include a main memory 1004 and a static memory 1006 that may communicate with each other via a bus 1008. The computer system 1000 may further include a video display unit 1010, such as a liquid crystal display (LCD), an organic light emitting diode (OLED), a flat panel display, a solid state display, or a cathode ray tube (CRT). Additionally, the computer system 1000 may include an input device 1012, such as a keyboard, and a cursor control device 1014, such as a mouse. The computer system 1000 may also include a disk drive unit 1016, a signal generation device 1018, such as a speaker or remote control, and a network interface device 1020.

In FIG. 10, the disk drive unit 1016 may include a computer-readable medium 1022 in which one or more sets of instructions 1024, e.g. software, may be embedded. Further, the instructions 1024 may embody one or more of the methods or logic as described herein. In a particular embodiment, the instructions 1024 may reside completely, or at least partially, within the main memory 1004, the static memory 1006, and/or within the processor 1002 during execution by the computer system 1000. The main memory 1004 and the processor 1002 also may include computer-readable media.

Dedicated hardware implementations, such as application specific integrated circuits, programmable logic arrays and other hardware devices, may be constructed to implement one or more of the tools described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit.

The present disclosure contemplates a computer-readable medium that includes instructions 1024 or receives and executes instructions 1024 responsive to a propagated signal so that a device connected to a network 1026 may communicate voice, video or data over the network 1026. Further, the instructions 1024 may be transmitted or received over the network 1026 via the network interface device 1020. While the computer-readable medium is shown to be a single medium, the term "computer-readable medium" includes a single medium or multiple media, such as a centralized or distributed database, and/or associated caches and servers that store one or more sets of instructions. The term "computer-readable medium" also includes any medium that is capable of storing, encoding or carrying a set of instructions for execution by a processor or that cause a computer system to perform any one or more of the methods or operations disclosed herein.

The computer-readable medium may include a solid-state memory such as a memory card or other package that houses one or more non-volatile read-only memories. Further, the computer-readable medium may be a random access memory or other volatile re-writable memory. Additionally, the computer-readable medium may include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The above disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

We claim:

1. A request management and workflow engine for a communications network, comprising:
    a provisioning service order engine to process a service order in accordance with a determined workflow, wherein the provisioning service order engine generates a service order result by completing a provisioning of all of service elements defined by the determined workflow;
    a provisioning network engine to manage provisioning of services into the communications network by dynamically composing a sequence of network command to be processed toward communications network, wherein the provisioning network engine generates an expected network command for a service to be provisioned;
    a network interface connected with the provisioning network engine, the network interface including a configuration file, wherein the configuration file includes validation and transformation information for the communications network in which the service order is being provisioned; and
    an internal engine list accessible by the provisioning service order engine and the provisioning network engine, wherein the service order engine adds virtual service elements to the internal engine list;
    wherein the provisioning network engine parses a key list and an attribute list into values, validates that the parsed key list and attribute list are compliant with determined values, and transforms values into network values expected by the network in accordance with the configuration file of the network interface.

2. The engine of claim 1, wherein the provisioning service order engine and provisioning network engine connect between a middleware application and the network interface.

3. The engine of claim 1, wherein the provisioning service order engine retrieves a key list and service order list from a service order.

4. The engine of claim 1, wherein the provisioning service order engine verifies a correct format of the key list and service order list.

5. The engine of claim 4, wherein the provisioning service order engine fills an application key with the key list and generates the internal engine list with the service element list if the format is correct.

6. The engine of claim 1, wherein the provisioning service order engine calls libraries as specified in the internal engine list.

7. The engine of claim 6, wherein the service order engine list determines if an error occurred from the called libraries.

8. The engine of claim 7, wherein the provisioning service order engine generates a service order if no error occurred.

9. The engine of claim 1, wherein the provisioning network engine calls actions specified by the network action table.

10. The engine of claim 9, wherein the provisioning network engine determines if an error occurred during the call.

11. The engine of claim 10, wherein the provisioning network engine generates a task result data if no error occurred.

12. A method for provisioning a service order on a network, the method comprising:
    receiving from a network interface a configuration file, wherein the configuration file includes validation and transformation information for a network in which a service order is being provisioned;
    parsing a key list and an attribute list into values in accordance with the configuration file;
    validating that the parsed key list and attribute list are compliant with a determined value in accordance with the configuration file;
    transforming the values to network values expected by a network in accordance with the configuration file;
    calling actions specified by a service logic engine table;
    determining if an error occurred from the calling;
    generating task result data if no error occurred, otherwise exiting the process without generating task result data; and
    accessing an internal engine list including virtual service elements.

13. The method of claim 12, wherein the determined values comprise a range, list and type.

* * * * *